（12) United States Patent
Ebert et al.

(10) Patent No.: US 7,847,051 B2
(45) Date of Patent: Dec. 7, 2010

(54) PHASE BOUNDARY PROCESSES FOR PREPARING POLYCARBONATES

(75) Inventors: Wolfgang Ebert, Krefeld (DE); Christian Kords, Krefeld (DE); Rolf Bachmann, Bergisch Gladbach (DE); Lars Obendorf, Leichlingen (DE); Johan Vanden Eynde, Zwijnaarde (BE); Bert Ruytinx, Halen (BE); Johann Seeba, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/398,243

(22) Filed: Mar. 5, 2009

(65) Prior Publication Data
US 2009/0275709 A1    Nov. 5, 2009

(30) Foreign Application Priority Data
Mar. 5, 2008   (DE) .................. 10 2008 012 613

(51) Int. Cl.
C08G 64/00   (2006.01)
C08G 63/18   (2006.01)
(52) U.S. Cl. .................. 528/196; 422/135; 528/198
(58) Field of Classification Search .................. 422/135; 528/196, 198
See application file for complete search history.

(56) References Cited

U.S. PATENT DOCUMENTS

| 2,964,794 | A | 12/1960 | Peilstoecker et al. |
| 2,991,273 | A | 7/1961 | Hechelhammer et al. |
| 2,999,835 | A | 9/1961 | Goldberg |
| 2,999,846 | A | 9/1961 | Schnell et al. |
| 3,148,172 | A | 9/1964 | Fox |
| 3,271,367 | A | 9/1966 | Schnell et al. |
| 3,464,198 | A | 9/1969 | Matsybayashi et al. |
| 3,879,348 | A | 4/1975 | Serini et al. |
| 3,986,269 | A | 10/1976 | Hancock |
| 4,122,112 | A | 10/1978 | Koda et al. |
| 4,318,773 | A | 3/1982 | Ullrich et al. |
| 4,423,207 | A | 12/1983 | Flock et al. |
| 4,627,949 | A | 12/1986 | Dhein et al. |
| 4,631,338 | A | 12/1986 | Meyer et al. |
| 4,980,105 | A | 12/1990 | Schmidt et al. |
| 4,982,014 | A | 1/1991 | Freitag et al. |
| 4,996,004 | A | 2/1991 | Bucheler et al. |
| 5,126,428 | A | 6/1992 | Freitag et al. |
| 5,227,458 | A | 7/1993 | Freitag et al. |
| 5,235,026 | A | 8/1993 | Wulff et al. |
| 5,306,803 | A | 4/1994 | Arlt et al. |
| 5,723,518 | A | 3/1998 | Kahl et al. |
| 6,776,925 | B2 | 8/2004 | Hofmann et al. |
| 2004/0249105 | A1 | 12/2004 | Nolte et al. |
| 2009/0240021 | A1* | 9/2009 | Heuer et al. .................. 528/196 |

FOREIGN PATENT DOCUMENTS

| BE | 866991 | 11/1978 |
| DE | 1137167 | 9/1962 |
| DE | 1570703 A1 | 2/1970 |
| DE | 2036052 | 1/1972 |
| DE | 2211956 A1 | 10/1973 |
| DE | 2725967 A1 | 12/1977 |
| DE | 2701173 A1 | 7/1978 |
| DE | 3332065 A1 | 3/1985 |
| DE | 3429960 A1 | 2/1986 |
| DE | 3832396 A1 | 2/1990 |
| DE | 19510651 A1 | 12/1995 |
| EP | 0003996 A1 | 9/1979 |
| EP | 0089801 A1 | 9/1983 |
| EP | 0101007 | 2/1984 |
| EP | 0267025 A1 | 5/1988 |
| EP | 0269324 A2 | 6/1988 |
| EP | 0304691 A2 | 3/1989 |
| EP | 0411510 A2 | 2/1991 |
| EP | 0256003 B1 | 4/1991 |
| EP | 0460450 A2 | 12/1991 |
| EP | 0517044 A2 | 12/1992 |
| EP | 0520272 A2 | 12/1992 |
| EP | 0634445 A1 | 1/1995 |
| EP | 1368407 B1 | 12/2003 |
| EP | 1599520 A1 | 11/2005 |
| FR | 1561518 | 3/1969 |
| GB | 905072 | 9/1962 |
| GB | 1122003 | 7/1968 |
| GB | 1229482 | 4/1971 |
| GB | 1364310 | 8/1974 |
| GB | 1367790 A | 9/1974 |
| GB | 1592724 | 7/1981 |

* cited by examiner

Primary Examiner—Terressa M Boykin
(74) Attorney, Agent, or Firm—Connolly Bove Lodge & Hutz LLP

(57) ABSTRACT

Continuous processes for preparing polycarbonates having a weight average molecular weight $M_w$, of 15,000 to 200,000 g/mol, the processes comprising reacting a dihydroxydiarylalkane and phosgene in the presence of a catalyst in a phase boundary process comprising: continuously dispersing in a disperser an organic phase comprising at least a portion of the phosgene and a solvent suitable for the polycarbonate and an aqueous phase comprising the dihydroxydiarylalkane, water and an alkali solution present in an amount of 1.5 to 2.5 moles per mole of the dihydroxydiarylalkane, to form a mixture; reacting the mixture in a first reactor with a residence time of less than 0.5 seconds; further reacting the mixture in a second reactor with addition of further alkali solution and, optionally, a chain terminator; and effecting further condensation in a third reactor with addition of further alkali solution and, optionally, a chain terminator, in the presence of the catalyst.

20 Claims, 3 Drawing Sheets

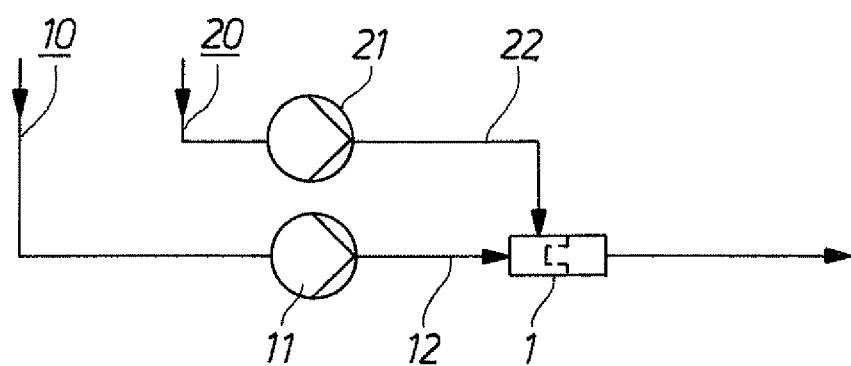
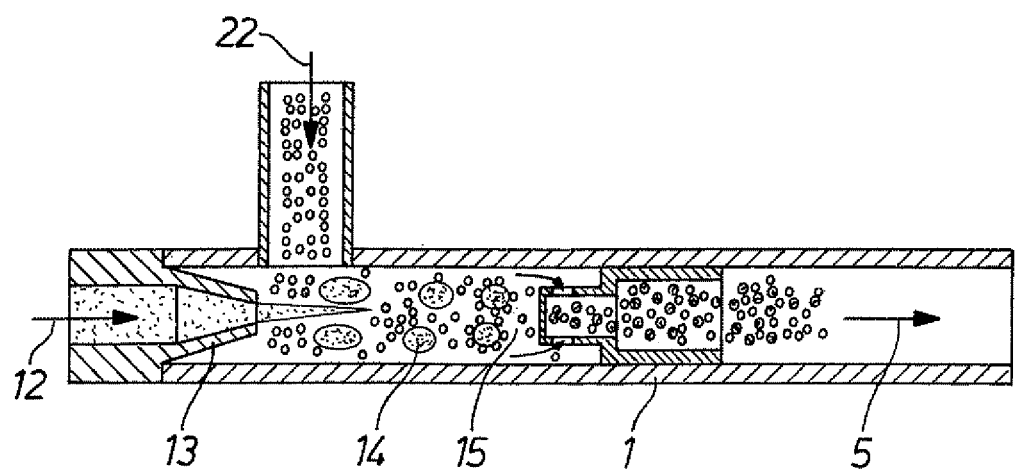

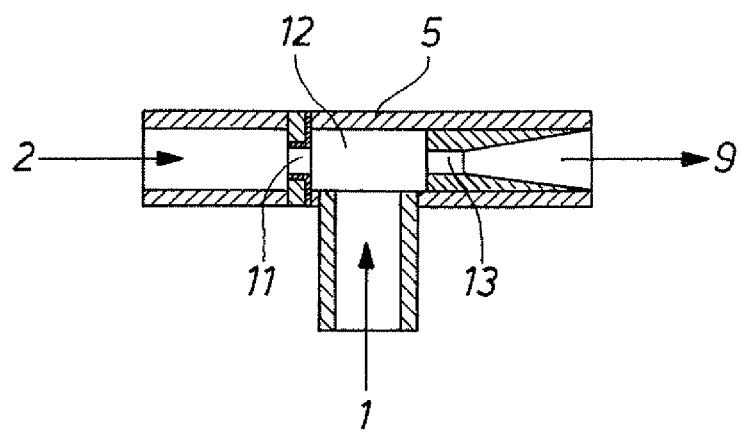
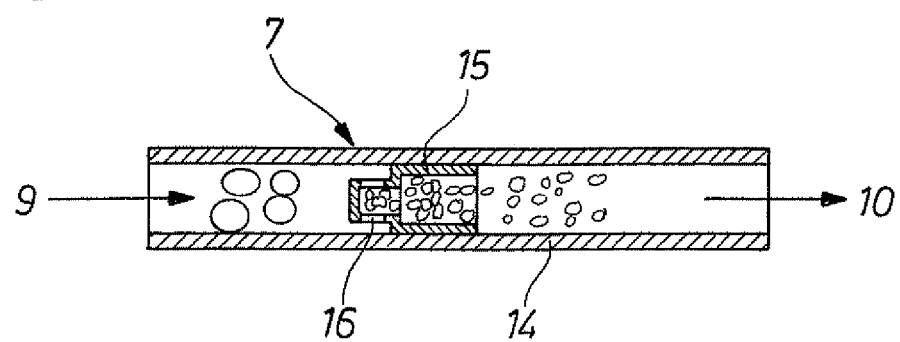

PHASE BOUNDARY PROCESSES FOR PREPARING POLYCARBONATES

BACKGROUND OF THE INVENTION

Polycarbonate preparation by a phase boundary process has been described by Schnell, "Chemistry and Physics of Polycarbonates", Polymer Reviews, Volume 9, Interscience Publishers, New York, London, Sydney 1964, pages 33-70; D. C. Prevorsek, B. T. Debona and Y. Kesten, Corporate Research Center, Allied Chemical Corporation, Morristown, N.J. 07960: "Synthesis of Poly(ester Carbonate) Copolymers" in Journal of Polymer Science, Polymer Chemistry Edition, Vol. 18, (1980)"; pages 75-90, D. Freitag, U. Grigo, P. R. Müller, N. Nouvertne, BAYER A G, "Polycarbonates" in Encyclopedia of Polymer Science and Engineering, Volume 11, Second Edition, 1988, pages 651-692, and finally by Dres. U. Grigo, K. Kircher and P. R- Müller, "Polycarbonate [Polycarbonates]" in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 118-145. A phase boundary process for the preparation of polycarbonate is also described in European Patent Publication No. EP0517044A and European Patent Publication No. EP0520272A, the entire contents of each of which are incorporated herein by reference.

For the preparation of polycarbonate by the phase boundary process, the phosgenation of a disodium salt of a bisphenol or a mixture of different bisphenols, initially introduced into aqueous alkaline solution or suspension, is effected in the presence of an inert organic solvent or solvent mixture which forms a second organic phase in addition to the aqueous phase. The resulting oligocarbonates mainly present in the organic phase are condensed with the aid of suitable catalysts to give high molecular weight polycarbonates dissolved in the organic phase, it being possible to control the molecular weight by suitable chain terminators (monofunctional phenols). The organic phase is finally separated off and the polycarbonate is isolated therefrom by various working-up steps.

Continuous processes for the preparation of condensates using phosgene—for example the preparation of aromatic polycarbonates or polyester carbonates or their oligomers—by the two-phase boundary process have as a rule the disadvantage that, for accelerating the reaction and/or improving the phase separation, more phosgene has to be used than is required for the product balance. The excess phosgene is then degraded in the synthesis in the form of byproducts—for example additional sodium-chloride or alkalicarbonate compounds. Typically, the phosgene excess of about 20 mol % based on the added diphenolate, is used for the continuous two-phase boundary process for the preparation of aromatic polycarbonates according to the prior art (cf. D. Freitag, U. Grigo, P. R. Müller, N. Nouvertne, BAYER A G, "Polycarbonates" in Encyclopedia of Polymer Science and Engineering, Volume 1, 1, Second Edition, 1998, pages 651-692).

In a reduction of the excess phosgene, undesired secondary effects occur, such as poor separation of the dispersion after the last reaction step, and hence increased water content in the organic solution or increased residual monomer or chain terminator contents in the waste water. Various methods for reducing the excess phosgene are discussed in the literature.

DE-A 2 725 967 discloses that it can be advantageous for the phosgene yield of a process first to combine aqueous and organic phase, which contains phosgene, in a tube and then to introduce said phases into a reactor of the tank type. The residence time in this tube should be between 0.5 and 15 seconds. The phosgene excess of the reaction is more than 10 mol %. This reduced phosgene excess requires a disadvantageous phase ratio of organic phase (i.e. oil) to water in order to achieve an effective separation of the two phases after the end of the reaction. Another disadvantage is the relatively long residence time for the phosgenation.

EP-A-304 691 describes a continuous phase boundary process for the preparation of polycarbonates. Here, an aqueous phase comprising diphenols and just the amount of alkalihydroxide required is combined with a phosgene-containing organic phase in a tube with the use of a static mixer. The phosgene excess of 20 to 100 mol % is very high and the residence time in the reaction tube for the first reaction step is 10 to 75 s. With this process, only prepolymers having a molecular weight of 4000 to 12 000 g/mol can be prepared.

EP 0 517 044 A2 describes the reduction of the phosgene excess by means of an annular hole nozzle and a flow tube, just sufficient sodium hydroxide solution being used so that BPA still remains dissolved. This procedure requires complicated regulation with measurement of the chlorocarbonic acid ester groups by means of an ATR crystal and regulated subsequent metering of sodium hydroxide solution to prevent overacidification of the reaction solution. Furthermore, this reaction requires a phase ratio of oil to water that forms a water-in-oil dispersion (oil/water phase ratio greater than 1). The residence time in the flow tube is at least several seconds.

EP 0 520 272 B1 discloses that a small phosgene excess can be achieved by splitting the stream of the BPA solution. Here, part of the BPA solution is mixed with the phosgene solution via a nozzle so that, in this step, a phosgene excess of at least 20 mol % is used. The mixture then reacts further in a flow tube with a minimum residence time of 3 s. Here too, it is required that the dispersion be a water-in-oil dispersion. The disadvantage of the process consists, inter alia, also in the greater effort for metering a second BPA stream.

A reduction of the phosgene excess in preparation of polycarbonate employing the phase boundary processes—where this was possible at all—was therefore achievable to date only with phase ratios disadvantageous for the subsequent separation of the two phases, complicated metering or regulation technology or long residence times of the reactants in the reaction apparatuses.

A reduction of the phosgene excess in the preparation of polycarbonate by the phase boundary processes is, however, important in that such a process will ensure a substantially smaller phosgene loss through subsequent destruction of the excess and moreover small amounts of byproducts would result from this destruction.

BRIEF SUMMARY OF THE INVENTION

The present invention relates, in general, to efficient continuous processes for the preparation of polycarbonate employing a phase boundary process, and to the use of a special disperser to mix the organic phase and the aqueous phase in such processes.

The various embodiments of the present invention provide processes in which phosgene excess can be reduced as far as possible, and in which the disadvantages of the prior art do not occur. In particular, various embodiments of the present invention provide processes which can permit efficient subsequent separation of the two phases.

Surprisingly, it was found that a process for the preparation of polycarbonate by a phase boundary processes, in which the aqueous and the organic phase are mixed by means of a disperser before the reaction and the phosgenation step is carried out with a residence time of less than 0.5 s, permits a reduction of the phosgene excess, based on the sum of the dihydroxydiarylalkanes used, to 15 mol % or less, preferably 13 mol % or less, particularly preferably 10 mol % or less.

In such processes according to the various embodiments of the present invention, neither complicated metering by means of two diphenol streams nor a complicated regulation technology is required. Owing to the extremely short residence time of the phosgene in the reaction apparatus, the process still has the advantage that the phosgene is converted in a short time and the remaining, reduced excess can be fed substantially more rapidly for destruction. This has advantages from both a safety and an economic point of view since the handling of the toxic phosgene is considerably limited with regard to time and the loss of unconverted phosgene, i.e. phosgene added in excess, and the resultant byproducts from the destruction of the latter are reduced.

The present invention therefore relates to a process for the continuous preparation of polycarbonates with average molecular weight averages $M_w$ of 15 000-200 000 g/mol by the phase boundary process from at least one dihydroxydiarylalkane, phosgene and at least one catalyst, optionally in the presence of at least one chain terminator and/or branching agent, characterized in that (a) a mixture of the organic and aqueous phase is produced by continuously dispersing the organic phase in the aqueous phase or the aqueous phase in the organic phase in a disperser,
  the organic phase containing at least one solvent suitable for the polycarbonate and all or some of the phosgene and
  the aqueous phase containing the dihydroxydiarylalkane(s), water and alkali solution, between 1.5 mol and 2.5 mol of alkali solution being added per mole of dihydroxydiarylalkane, (b) the mixture is then reacted in a reactor with a residence time of less than 0.5 s, (c) the reaction mixture is then allowed to react further with addition of further alkali solution and optionally chain terminator(s) in a further reactor, and (d) further condensation is then effected by addition of further alkali solution and optionally chain terminator(s) and at least one catalyst in at least one further reactor.

One embodiment of the present invention includes a continuous process for preparing a polycarbonate having a weight average molecular weight $M_w$ of 15,000 to 200,000 g/mol, the process comprising reacting a dihydroxydiarylalkane and phosgene in the presence of a catalyst in a phase boundary process comprising:
  continuously dispersing in a disperser an organic phase and an aqueous phase to form a mixture, the organic phase comprising at least a portion of the phosgene and a solvent suitable for the polycarbonate, and the aqueous phase comprising the dihydroxydiarylalkane, water and an alkali solution present in an amount of 1.5 to 2.5 moles per mole of the dihydroxydiarylalkane;
  reacting the mixture in a first reactor with a residence time of less than 0.5 seconds;
  further reacting the mixture in a second reactor with addition of a further amount of an alkali solution and, optionally, a chain terminator; and
  effecting further condensation in a third reactor with addition of a second further amount of an alkali solution and, optionally, a chain terminator, in the presence of the catalyst.

During the dispersing of the organic phase in the aqueous phase or of the aqueous phase in the organic phase by means of a disperser, an oil-in-water or a water-in-oil dispersion may be produced, oil being understood as the organic phase. Preferably, an oil-in-water dispersion is produced during the dispersing. Preferably, the organic phase is dispersed continuously in the aqueous phase by means of the disperser.

By definition, an oil-in-water dispersion is one in which water forms the external (continuous) phase and oil forms the internal (dispersed) phase, i.e. oil droplets are distributed in water. A water-in-oil dispersion is consequently one in which oil forms the external phase and water the internal phase.

BRIEF DESCRIPTION OF THE SEVERAL VIEWS OF THE DRAWING

The foregoing summary, as well as the following detailed description of the invention, may be better understood when read in conjunction with the appended drawings. For the purpose of assisting in the explanation of the invention, there are shown in the drawings representative embodiments which are considered illustrative. It should be understood, however, that the invention is not limited in any manner to the precise arrangements and instrumentalities shown.

In the drawings:

FIG. 1 is a schematic depiction of a disperser suitable for use in accordance with an embodiment of the present invention;

FIG. 2 is a digrammatic representation of the disperser depicted in FIG. 1;

FIG. 3 is a digrammatic representation of a predisperser suitable for use in accordance with an embodiment of the present invention;

FIG. 4 is a digrammatic representation of a homogenizing nozzle suitable for use in accordance with an embodiment of the present invention;

DETAILED DESCRIPTION OF THE INVENTION

Figure 5:
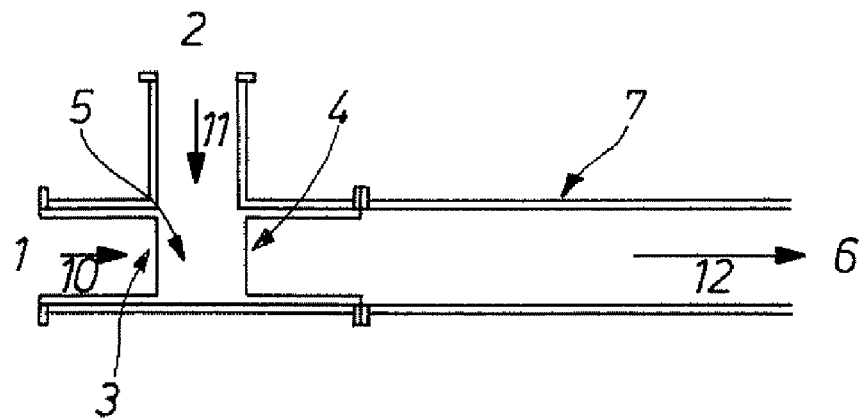
FIG. 5 is a digrammatic representation of a disperser suitable for use in accordance with another embodiment of the present invention.

As used herein, the singular terms "a" and "the" are synonymous and used interchangeably with "one or more" and "at least one," unless the language and/or context clearly indicates otherwise. Accordingly, for example, reference to "a polycarbonate" herein or in the appended claims can refer to a single polycarbonate or more than one polycarbonate. Additionally, all numerical values, unless otherwise specifically noted, are understood to be modified by the word "about."

The organic phase may already contain some or all of the required phosgene before the dispersing with the aqueous phase. Preferably, the organic phase already contains the total amount of required phosgene, including the phosgene excess used, before the dispersing.

The introduction of the phosgene into the organic phase can be effected in gaseous or liquid form. The excess of phosgene used, based on the sum of the dihydroxydiarylalkanes used, is preferably only 15 mol % or less, particularly preferably 13 mol % or less, very particularly preferably 10 mol % or less. The excess of phosgene used, based on the sum of the dihydroxydiarylalkanes used, is preferably between 3 and 15 mol %, more preferably between 3 and 13 mol %, very particularly preferably between 5 and 10 mol %.

The pH of the aqueous phase should be kept in the alkaline range, preferably between 8.5 and 12, while optionally metering further alkali solution once or several times during and after the phosgene metering, while it should be 10 to 14 after the addition of catalysts. The further metering of the alkali solution can optionally also be effected in the form of corresponding further metering of dihydroxydiarylalkane solution in alkali solution.

The phosgene metering is effected before the mixing with the aqueous phase, completely or partly directly into the organic phase. Any portions of phosgene can also be metered into the aqueous phase before the dispersing or into the dispersion after the dispersing. Furthermore, can the phosgene either completely or partly be metered into a recycled part-stream of the synthesis mixture of both phases, this part-stream preferably being recycled before the addition of catalysts. In another embodiment, the described aqueous phase is mixed with the phosgene-containing organic phase and then added to the abovementioned recycled part-stream after a residence time of less than 5 seconds, or the two phases, the described aqueous phase with the phosgene-containing organic phase are mixed directly into the abovementioned recycled part-stream. Particularly preferably, the complete phosgene metering is effected before the mixing with the aqueous phase, directly into the organic phase. In all these embodiments, the pH ranges described above should be maintained, if appropriate by metering of further sodium hydroxide solution once or several times or correspondingly metering further bisphenolate solution. Likewise, the temperature range must be maintained, if appropriate by cooling or dilution.

The organic phase may consist of one solvent or mixtures of a plurality of solvents. Suitable solvents are aromatic and/or aliphatic chlorinated hydrocarbons, preferably dichloromethane, trichloroethylene, 1,1,1-trichloroethane, 1,1,2-trichloroethane and chlorobenzene and mixtures thereof. However, it is also possible to use aromatic hydrocarbons, such as benzene, toluene, m-/p-/o-xylene, or aromatic ethers, such as anisole, alone, as a mixture or additionally or as a mixture with chlorinated hydrocarbons; dichloromethane and chlorobenzene and mixtures thereof are preferred. Another embodiment of the synthesis uses solvents which do not dissolve but only partly swell polycarbonate. It is therefore also possible to use nonsolvents for polycarbonate in combination with solvents. In this case, it is also possible to use, as solvents, solvents soluble in the aqueous phase, such as tetrahydrofuran, 1,3- or 1,4-dioxane or 1,3-dioxolane, if the solvent partner forms the second organic phase.

Suitable dihydroxydiarylalkanes—hereinabove and hereinbelow also referred to inter alia as diphenol—are those of the general formula

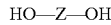

HO—Z—OH in which Z is a divalent organic radical having 6 to 30 carbon atoms, which contains one or more aromatic groups. Examples of such compounds which can be used in the process according to the invention are dihydroxydiarylalkanes, such as hydroquinon, resorcinol, dihydroxybiphenyl, bis(hydroxyphenyl)alkanes, bis(hydroxyphenyl)cycloalkanes, bis(hydroxyphenyl)sulphides, bis(hydroxyphenyl)ethers, bis(hydroxyphenyl)ketones, bis(hydroxyphenyl)sulphones, bis(hydroxyphenyl)sulphoxides, α,α'-bis(hydroxyphenyl)diisopropylbenzenes, and compounds thereof which are alkylated, alkylated on the nucleus and halogenated on the nucleus.

Preferred dihydroxydiarylalkanes are 4,4'-dihydroxybiphenyl, 2,2-bis(4-hydroxyphenyl)-1-phenylpropane, 1,1-bis(4-hydroxyphenyl)phenylethane, 2,2-bis(4-hydroxyphenyl)propane (bisphenol A (BPA)), 2,4-bis(4-hydroxyphenyl)-2-methylbutane, 1,3-bis[2-(4-hydroxyphenyl)-2-propyl] benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)-sulphone, 2,4-bis(3,5-dimethyl-4-hydroxyphenyl)-2-methylbutane, 1,3-bis[2-(3,5-dimethyl-4-hydroxyphenyl)-2-propyl]benzene, 1,1-bis(4-hydroxyphenyl)cyclohexyne and 1,1-bis(4-hydroxyphenyl)-3,3,5-trimethyl-cyclohexane (bisphenol TMC).

Particularly preferred dihydroxydiarylalkanes are 4,4'-dihydroxybiphenyl, 1,1-bis(4-hydroxyphenyl)phenylethane, 2,2-bis(4-hydroxyphenyl)propane (bisphenol A (BPA)), 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

These and further suitable dihydroxydiarylalkanes are described, for example, in U.S. Pat. No. 2,999,835, U.S. Pat. No. 3,148,172, U.S. Pat. No. 2,991,273, U.S. Pat. No. 3,271,367, U.S. Pat. No. 4,982,014 and U.S. Pat. No. 2,999,846, in the German laid-open patent applications DE-A 1 570 703, DE-A 2 063 050, DE-A 2 036 052, DE-A 2 211 956 and DE-A 3 832 396, the French patent FR-A 1 561 518, in the monograph by H. Schnell, Chemistry and Physics of Polycarbonates, Interscience Publishers, New York 1964, page 28 et seq.; page 102 et seq., and by D. G. Legrand, J. T. Bendler, Handbook of Polycarbonate Science and Technology, Marcel Dekker New York 2000, page 72 et seq.

In the case of the preparation according to the invention of homopolycarbonates, only one dihydroxydiarylalkane is used; in the case of the preparation according to the invention of copolycarbonates, a plurality of dihydroxydiarylalkanes is used, it of course being possible for the dihydroxydiarylalkanes used, as well as all other chemicals and auxiliaries added to the synthesis, to be contaminated with the impurities originating from their own synthesis, handling and storage, although it is desirable to work with raw materials which are as pure as possible.

In the context of the invention, alkali solution is preferably to be understood as meaning sodium hydroxide solution, potassium hydroxide solution or mixtures of these, particularly preferably sodium hydroxide solution.

The aqueous phase in the phase boundary process for the preparation of the polycarbonate contains alkali solution, one or more dihydroxydiarylalkanes and water, it being possible for the concentration of this aqueous solution, based on the sum of the dihydroxydiarylalkanes, calculated not as alkali metal salt but as free dihydroxydiarylalkane, to vary preferably between 1 and 30% by weight, particularly preferably between 3 and 25% by weight, very particularly preferably between 8 and 17% by weight based on the total weight of the aqueous phase. The organic phase in the phase boundary process for the preparation of the polycarbonate preferably contains 12 to 22% by weight of polycarbonates with an $M_w$ of greater than 45 000, based on the total weight of the organic phase, and preferably 12 to 40% by weight, particularly preferably 15 to 30% by weight of polycarbonates with an $M_w$ of 45 000 or less, based on the total weight of the organic phase. In the case of higher concentrations, it may be necessary to thermostate the solutions. The alkali hydroxide used for dissolving the dihydroxydiarylalkanes, e.g. sodium hydroxide or potassium hydroxide, may be used in solid form or as a corresponding aqueous alkali solution. The concentration of the alkali solution depends on the target concentration of the dihydroxydiarylalkane solution strived for but as a rule it is between 5 and 25% by weight, preferably 5 and 10% by weight, based on 100% strength alkali solution, or is chosen to be more concentrated and then diluted with water. In the process with subsequent dilution, alkali solutions having concentrations between 15 and 75% by weight, preferably 25 and 55% by weight, optionally thermostated, are used. The alkali metal content per mole of dihydroxydiarylalkane is dependent on the structure of the dihydroxydiarylalkane but as a rule is from 1.5 mol of alkali/mole of dihydroxydiarylalkane to 2.5 mol of alkali/mole of dihydroxydiarylalkane, preferably from 1.8 to 2.2 mol of alkali/mole of dihydroxydiarylalkane and, in the particularly preferred case where bisphenol A is used as the sole dihydroxydiarylalkane, from 1.85 to 2.15 mol of alkali. If more than one dihydroxydiarylalkane is used, these may be dissolved together. Since the solubility of dihydroxydiarylalkanes is very greatly dependent on the amount of alkali used, it may however be advantageous to have not one solution comprising two dihydroxydiarylalkanes but preferably two solutions having one dihydroxydiarylalkane each dissolved in a suitable alkali solution, which are then metered separately so that the correct mixing ratio results. Furthermore, it may be advantageous to dissolve the dihydroxydiarylalkane(s) not in alkali solution but in dilute dihydroxydiarylalkane solution provided with additional alkali. The dissolution processes may start from solid dihydroxydiarylalkane or generally in scale or prill form, or from molten diphenol. In the case of sodium hydroxide or sodium hydroxide solution, the alkali metal hydroxide used or the alkali solution, respectively, may have been prepared, for example, by the amalgam process or the so-called membrane process. Both processes have long been used and are familiar to the person skilled in the art. In the case of sodium hydroxide solution, that prepared by the membrane process is preferably used.

In such an aqueous solution and/or the aqueous phase, the dihydroxydiarylalkane(s) is or are present completely or partly in the form of the corresponding alkali metal salts or dialkali metal salts.

An optionally practised metering of dihydroxydiarylalkane(s) after or during the phosgene introduction can be carried out for as long as phosgene or its direct derivatives, the chlorocarboxylic esters are present in the reaction.

Suitable catalysts for the process according to the invention are preferably tertiary amines, such as, for example, triethylamine, tributylamine, trioctylamine, N-ethylpiperidine, N-methylpiperidine or N-iso/n-propylpiperidine, quaternary ammonium salts, such as, for example, tetrabutylammonium, tributylbenzylammonium, or tetraethylammonium hydroxide, chloride, bromide, hydrogen sulphate or tetrafluoroborate, and the phosphonium compounds corresponding to the abovementioned ammonium compounds. These compounds are described in the literature as typical phase boundary catalysts, are commercially available and are familiar to the person skilled in the art. The catalysts can be added to the synthesis individually, as a mixture or side by side and in succession, optionally also before the phosgenation, but meterings after the phosgene introduction are preferred, unless an onium compound—i.e. ammonium or phosphonium compound—or mixtures of onium compounds are used as catalysts. In the case of such an onium salt catalysis, an addition before the phosgene metering is preferred. The metering of the catalyst or of the catalysts can be effected as such, in an inert solvent, preferably a solvent or one of the solvents of the organic phase in the polycarbonate synthesis, or as aqueous solution. In the case of the use of tertiary amines as a catalyst, for example, the metering thereof can be effected in aqueous solution as the ammonium salts thereof with acids, preferably mineral acids, in particular hydrochloric acids. With the use of a plurality of catalysts or the metering of portions of the total amount of catalyst, it is of course also possible to carry out different metering procedures at different places and at different times. The total amount of the catalyst used is between 0.001 and 10 mol %, preferably 0.01 to 8 mol %, particularly preferably 0.05 to 5 mol %, based on moles of dihydroxydiarylalkanes used.

For regulating the molecular weight, the addition of one or more monofunctional chain terminator(s), such as phenol or alkylphenols, in particular phenol, p-tert-butylphenol, isooctylphenol, cumylphenol, the chlorocarbonic acid esters thereof or acid chlorides of monocarboxylic acids or mixtures of these chain terminators may optionally be required. Such chain terminators are optionally either fed to the reaction with dihydroxydiarylalkane(s) or added to the synthesis at any desired time during the synthesis as long as phosgene or chlorocarbonic acid terminal groups are still present in the reaction mixture, in the case of the acid chlorides and chlorocarbonic acid esters as chain terminators, as long as sufficient phenolic terminal groups of the resulting polymer are available. Preferably, however, the chain terminator or terminators are added after the phosgenation at a place or at a time where or when phosgene is no longer present but the catalyst has not yet been metered in, i.e. they can be metered in before the catalyst, together with the catalyst or parallel thereto.

In the same way, one or more branching agents or mixtures of branching agents can optionally be added to the synthesis. Usually, however, such branching agents are added before the chain terminator(s). For example, trisphenols, quarterphenols, acid chlorides of tri- or tetracarboxylic acids or mixtures of the polyphenols or of the acid chlorides are used as branching agents.

Examples of compounds suitable as branching agents and having three or more than three phenolic hydroxyl groups are phloroglucinol, 4,6-dimethyl-2,4,6-tri(4-hydroxyphenyl)-hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis(4,4-bis(4-hydroxyphenyl)cyclohexyl]propane, 2,4-bis(4-hydroxyphenylisopropyl)phenol, tetra(4-hydroxyphenyl)methane.

Examples of other trifunctional compounds suitable as branching agents are 2,4-dihydroxybenzoic acid, trimesic acid, cyanuric chloride and 3,3-bis(3-methyl-4-hydroxyphenyl)-2-oxo-2,3-dihydroindole.

Particularly preferred branching agents are 3,3-bis(3-methyl-4-hydroxyphenyl)-2-oxo-2,3-dihydroindole and 1,1,1-tri(4-hydroxyphenyl)ethane.

The average molecular weight averages stated in the context of this application are weight averages ($M_w$) which were determined by gel permeation chromatography (GPC) (using polycarbonate standard).

The synthesis of polycarbonates from dihydroxydiarylalkanes and phosgene in an alkali medium is an exothermic reaction and is preferably carried out according to the invention in a temperature range of −5° C. to 100° C., particularly preferably of 15° C. to 80° C., very particularly preferably of 25° C. to 65° C., superatmosperic pressure having to be used, depending on solvent or solvent mixture.

The polycarbonate synthesis is carried out continuously. The total reaction, i.e. conversion and further condensation, can therefore be affected in stirred tanks, tubular reactors, pumped-circulation reactors or stirred tank cascades or combinations thereof the use of the abovementioned mixing members ensuring that aqueous and organic phase as far as possible separate only when the synthesis mixture has completely reacted, i.e. no hydrolysable chlorine of phosgene or chlorocarbonic esters is present. In a preferred embodiment of the process according to the invention, step (b) is carried out in a flow tube. In such an arrangement, the extremely short residence time of less than 0.5 s of the mixing carried out can be particularly advantageously realized. In a further preferred embodiment of the process according to the invention, step (c) is carried out in a pumped-circulation reactor. In a further preferred embodiment of the process according to the invention, step (b) is carried out in a pumped-circulation reactor followed by further dwell reactors.

The two phases which form the reaction mixture, i.e. organic and aqueous phase, are mixed according to the invention by means of a disperser. Suitable dispersers are preferably nozzles or jet dispersers, in particular those which permit a preferred direction of metering. Suitable dispersers for use in the processes according to the various embodiments of the present invention are known to the person skilled in the art and include those described, for example, in European Patent Publication No. EP1368407A and European Patent Publication No. EP1599520, the entire contents of each of which are incorporated herein by reference.

Suitable nozzles are, for example, fan spray nozzles, annular slot nozzles, orifice nozzles, Lefos nozzles or smooth-jet nozzles.

Nozzles suitable according to the invention may be those having a specific energy input of, preferably, $0.02 \cdot e^5$ to $5.0 \cdot e^6$ W/L (watts/litre), particularly preferably $0.5 \cdot e^5$ to $1 \cdot e^6$ W/l. Apparatuses of this type are known as jet dispersers, aperture plate dispersers or high-pressure homogenizers.

The pressure to be applied can preferably be 0.001 to 1 MPa, particularly preferably 0.001 to 0.5 MPa.

FIG. 1 describes a disperser preferred according to the invention and intended for continuous operation. Via the feed 20, the aqueous or organic phase—preferably the aqueous phase—is fed to the jet disperser 1 by means of pump 21 via line 22. Furthermore, via the feed 10, the respective other phase—organic or aqueous phase, preferably the organic phase—is fed by means of pump 11 via line 12. After dispersing in the jet disperser 1, the dispersion is passed into the corresponding reactor, preferably into a flow tube (not shown in FIG. 1).

FIG. 2 shows an enlarged diagram of the jet disperser from FIG. 1. The aqueous or organic phase is introduced into the pre-emulsion space 15 along arrow 22. The respective other phase is introduced into the pre-emulsion space 15 in the direction of the arrow 12 through the predispersing nozzle 13. 14 designates large droplets of the phase which is dispersed in the other phase. After passage through the jet disperser, the dispersion leaves the jet disperser in the direction of the arrow 5.

However, it is also possible to operate dispersers with a substantially lower applied pressure. This is achieved by using a plurality of bores and/or the bores having larger diameters so that the total area of all bores is increased. The required number and the diameter of the bores can be calculated via the pressure drop. Such methods of calculation are described in the literature and are known to the person skilled in the art.

In preferred embodiments of the process according to the invention, dispersers used are those in which the organic and aqueous phase are fed to a predisperser preferably separately to a predisperser by one pump in each case. The pressure of these pumps is in each case preferably not more than 2.5 MPa, preferably from 0.001 to 0.5 MPa.

Homogenization of the predispersion is subsequently effected, preferably in a homogenizing nozzle, likewise at a pressure of not more than 2.5 MPa, preferably from 0.001 to 0.5 MPa. In preferred embodiments of the process according to the invention, the disperser accordingly contains a predisperser and a homogenizing nozzle.

Any desired nozzles, such as, for example, fan spray nozzles, annular slot nozzles, aperture nozzles, Lefos nozzles or smooth-jet nozzles, and jet dispersers are suitable as predispersers. Any desired nozzles, such as, for example, fan spray nozzles, annular slot nozzles, aperture nozzles, Lefos nozzles or smooth-jet nozzles, and jet dispersers are likewise suitable as homogenizing nozzles.

FIG. 3 shows a preferred embodiment of a predisperser 5 as used for the preparation of a predispersion 9 from aqueous and organic phase. In the mixer 5, the organic phase 2 is forced via a nozzle bore 11 into the aqueous phase 1 in a premixing chamber 12. The organic phase 2 and the aqueous phase 1 are forced together through a nozzle bore 13, with the result that a predispersion 9 is formed. Conversely, it is also possible to force the aqueous phase 1 into the organic phase 2 in the mixer 5.

FIG. 4 shows a preferred embodiment of a homogenizing nozzle. According to FIG. 4, the predispersion 9 enters the homogenizer (homogenizing nozzle) 7 which is in the form of a jet disperser and consists of a tube and an insert 16 having lateral nozzle bores. The predispersion 9 is forced through the nozzle bores. At the opposite end, the dispersion 10 exits the jet disperser 7. Such a jet disperser is disclosed in DE-A 195 10 651. It may preferably be one according to FIG. 2. In principle, similar jet dispersers can also be used.

FIG. 5 shows a preferred embodiment of a disperser, in which the aqueous phase 2 is introduced in the direction of the arrow 11 and the organic phase 1 in the direction of the arrow 10 through an aperture plate 3 into the predispersing space 5. The predispersed two-phase mixture—also referred to as predispersion—is then forced through the aperture plate 4 and thus subjected to the further dispersing (homogenization). The dispersion 6 then leaves the disperser through the flow tube 7 in the direction of the arrow 12.

The present invention furthermore relates to the use of one of the dispersers described above for producing a mixture of organic and aqueous phase in the preparation of polycarbonate by the process according to the invention.

Those dispersers with which the mixture produced from organic and aqueous phase is an oil-in-water dispersion are particularly suitable for this purpose.

Such mixing according to the invention of organic and aqueous phase by means of such dispersers permits, inter alia, a substantially shorter residence time of less than 0.5 s, preferably even less than 250 ms, of the mixture in the reactor of process step (b) with continued high conversion in the reaction. A high energy input during the dispersing of the two streams (organic and aqueous phase) has advantages in that very small drops, preferably smaller than 5 µm, can be formed and the phosgene reacts in times of less than 0.5 s, preferably less than 250 ms. This both permits the use of small apparatuses (reactors) for complete phosgene conversion and shortens the handling time of this toxic reactant.

In spite of the small phosgene excess at the end of the reaction, the process according to the reaction permits good phase separation and both low water content in the organic phase and also low residual monomer content in the aqueous phase.

For working up the reacted, at least two-phase reaction mixture still containing traces, preferably less than 2 ppm, of chlorocarbonic acid esters, settling is allowed for phase separation. The aqueous alkaline phase is optionally recycled wholly or partly to the polycarbonate synthesis as an aqueous phase or fed to the wastewater working up where solvent and catalyst fractions are separated off and optionally recycled to the polycarbonate synthesis. In another variant of the working up, after the organic impurities have been separated off in particular from solvents and polymer residues, and optionally after a certain pH has been established, for example by addition of sodium hydroxide solution, the salt is separated off and can be fed, for example, to the chloralkali electrolysis, while the aqueous phase is optionally fed back to the polycarbonate synthesis.

The organic phase containing the polycarbonate can then be purified in various ways known to the person skilled in the art for removing the alkaline, ionic or catalytic contaminations.

Even after one or more settling processes, optionally supported by passages through settling tanks, stirred tanks, coalescers or separators and combinations of these measures—it optionally being possible to meter in water in each separation step or some separation steps, in certain circumstances with the use of active or passive mixing members—the organic phase still contains proportions of the aqueous alkaline phase in fine droplets and of the catalyst(s). After this coarse separation of the alkaline, aqueous phase, the organic phase can be washed once or several times with dilute acids, mineral acids, carboxylic acids, hydroxycarboxylic acids and/or sulphonic acids. Aqueous mineral acids, in particular hydrochloric acid, phosphorus acid, phosphoric acid or mixtures of these acids are preferred. The concentration of these acids should preferably be in the range of 0.001 to 50% by weight, preferably 0.01 to 5% by weight. Furthermore the organic phase can be repeatedly washed with desalinated or distilled water. The separation of the organic phase, optionally dispersed with parts of the organic phase, after the individual wash steps is effected by means of settling tanks, stirred tanks, coalescers or separators or combinations of these measures, it being possible to meter in the wash water between the wash steps, optionally with the use of active or passive mixing members. Between these wash steps or after the washing, acids, preferably dissolved in the solvent on which the polymer solution is based, can optionally be added. Hydrogen chloride gas, phosphoric acid or phosphorus acid, which can optionally also be used as mixtures, are preferably used here. The purified polycarbonate solution thus obtained should preferably contain not more than 5% by weight, preferably less than 1% by weight, very particularly preferably less than 0.5% by weight, of water after the last separation process.

The isolation of the polycarbonate from the solution can be effected by evaporation of the solvent by means of temperature, vacuum or a heated entraining gas. Other isolation methods are, for example, crystallization and precipitation.

If the concentration of the polycarbonate solution and possibly also the isolation of the polycarbonate are effected by distilling off the solvent, optionally by superheating and expansion, the term "flash process" is used. Such a process is known to the person skilled in the art and is described, for example, in "Thermische Trennverfahren [Thermal separation processes]", VCH Verlagsanstalt 1988, page 114. If instead a heated carrier gas is sprayed together with the solution to be evaporated down, the term "spray evaporation/spray drying" is used, which is described by way of example in Vauck, "Grundoperationen chemischer Verfahrenstechnik [Basic operations of chemical process engineering]", Deutscher Verlag für Grundstoffundustrie 2000, 11th edition, page 690. All these processes are described in the patent literature and in textbooks and are familiar to the person skilled in the art.

On removal of the solvent by temperature (distilling off) or the technically more effective flash process, highly concentrated polycarbonate melts are obtained. In the flash process, polymer solutions are repeatedly heated under slightly superatmospheric pressure to temperatures above the boiling point under atmospheric pressure and these solutions superheated relative to atmospheric pressure are then let down into a vessel at low pressure, e.g. atmospheric pressure. It may be advantageous to ensure that the concentration stages, or in other words the temperature stages of the superheating, are not chosen to be too large but preferably to choose a two- to four-stage process.

The residues of the solvent can be removed from the highly concentrated polycarbonate melts thus obtained either directly from the melt by means of vented extruders (cf. for example BE-A 866 991, EP-A 0 411 510, U.S. Pat. No. 4,980,105, DE-A 33 32 065), thin-film evaporators (cf. for example EP-A 0 267 025), falling-film evaporators, strand evaporators or friction compacting (cf. for example EP-A 0 460 450), optionally also with addition of an entraining agent, such as nitrogen or carbon dioxide, or with the use of a vacuum (cf. for example EP-A 0 039 96, EP-A 0 256 003, U.S. Pat. No. 4,423,207), alternatively also by subsequent crystallization (cf. for example DE-A 34 29 960) and/or expulsion of the residues of the solvent by heating in the solid phase (cf. for example U.S. Pat. No. 3,986,269, DE-A 20 53 876). These processes too and the apparatuses required for this purpose are described in the literature and are familiar to the person skilled in the art.

Polycarbonate granules can—if possible—be obtained by direct spinning of the melt and subsequent granulation or by use of discharge extruders from which spinning is effected in air or under liquid, generally water. If extruders are used, additives can be added to the polycarbonate melt before the extruder, optionally with use of static mixers or by side extruders in this extruder.

Alternatively, the polycarbonate solution can be subjected to a spray evaporation. During spraying, the polycarbonate solution, optionally after heating, is either sprayed into a vessel at reduced pressure or sprayed by means of a nozzle with a heated carrier gas, e.g. nitrogen, argon or steam, into a vessel at atmospheric pressure. In both cases, powders (dilute) or flakes (concentrated) of the polymer are obtained, depending on the concentration of the polymer solution, from which the last residues of the solvent optionally also have to be removed as above. Thereafter, granules can be obtained by means of a compounding extruder and subsequent spinning. Here too, additives as described above can be added in the periphery or to the extruder itself. Often, it may be necessary to pass through a compacting step for the polymer powder before the extrusion owing to the low bulk density of the powders and flakes.

The polymer can be substantially precipitated from the washed and optionally still concentrated polycarbonate solution by addition of a nonsolvent for polycarbonate. The nonsolvents act as precipitating agents. Here, it is advantageous first to add a small amount of the nonsolvent and optionally also to allow waiting times between the additions of the batches of nonsolvent. It may also be advantageous to use different nonsolvents. For example aliphatic or cycloaliphatic hydrocarbons, in particular heptane, isooctane or cyclohexane, alcohols, such as, for example, methanol, ethanol or isopropanol, ketones, such as, for example, acetone, or mixtures of these are used as precipitating agents here. During the precipitation, as a rule the polymer solution is slowly added to the precipitating agent. The polycarbonates thus obtained are processed to granules as described in the case of the spray evaporation and additives are optionally introduced.

According to other processes, precipitation and crystallization products or amorphously solidified products are crystallized in fine-particle form by passing over vapours of one or more nonsolvents for polycarbonate, with simultaneous heating below the glass transition temperature, and are further condensed to give higher molecular weights. If the oligomers optionally have different terminal groups (phenolic and chain terminator ends), the term solid-phase condensation is used.

The addition of additives serves for increasing the duration of use or improving the colour stability (stabilizers), simplifying the processing (e.g. demoulding agents, flow improvers, antistatic agents) or adapting the polymer properties to certain loads (impact modifiers, such as rubbers; flameproofing agents, colorants, glass fibres).

These additives can be added to the polymer melt individually or together in any desired mixtures or in a plurality of different mixtures. This can be effected directly during the isolation of the polymer or after melting of granules in a so-called compounding step. The additives or the mixtures thereof can be added as a solid, preferably as powder, or as melt to the polymer melt. Another method of metering is the use of masterbatches or mixtures of masterbatches of the additives or additive mixtures.

Suitable additives are described, for example, in "Additives for Plastics Handbook, John Murphy, Elsevier, Oxford 1999", and in "Plastics Additives Handbook, Hans Zweifel, Hanser, Munich 2001".

Examples of suitable antioxidants or heat stabilizers are: alkylated monophenols, alkylthiomethylphenols, hydroquinones and alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, acylaminophenols, esters of β-(3,5-di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid, esters of 3,5-di-tert-butyl-4-hydroxyphenylacetic acid, amides of β-(3,5-di-tert-butyl-4-hydroxyphenyl)propionic acid, suitable thiosynergistic agents, secondary antioxidants, phosphites, phosphonites, phosphonates and phosphanes, benzofuranones and indolinones.

Preferred antioxidants or heat stabilizers are organic phosphites, phosphonates and phosphanes, generally those in which the organic radicals completely or partially comprise optionally substituted aromatic radicals.

Suitable complexing agents for heavy metals and for neutralization of traces of alkali are, for example, o- or m-phosphoric acids, completely or partly esterified phosphates or phosphites.

Suitable light stabilizers (UV absorbers) are, for example, 2-(2'-hydroxyphenyl)benzotriazoles, 2-hydroxybenzophenones, esters of substituted and unsubstituted benzoic acids, acrylates, sterically hindered amines, oxamides, 2-(2 hydroxyphenyl)-1,3,5-triazines or substituted benzotriazoles; substituted benzotriazoles are particularly preferred.

Polypropylene glycols alone or in combination with, for example, sulphones or sulphonamides as stabilizers can be used to prevent damage by gamma-rays.

These and other stabilizers can be used individually or in combinations and are added in said forms to the polymer.

In addition, processing auxiliaries, such as demoulding agents, such as, for example, derivatives of long-chain fatty acids, may be added. For example, pentaerythrityl tetrastearate and glyceryl monostearate are preferred. They are used alone or as a mixture, preferably in an amount of 0.02 to 1% by weight, based on the mass of the composition. Suitable flame-retardant additives are phosphate esters, i.e. triphenyl phosphate, resorcinol diphosphoric acid esters, bromine-containing compounds, such as brominated phosphoric acid esters, brominated oligocarbonates and polycarbonates, and preferably salts of fluorinated organic sulphonic acids. Suitable impact modifiers are butadiene rubber with grafted-on styrene-acrylonitrile or methyl methacrylate, ethylene-propylene rubbers with grafted-on maleic anhydride, ethyl acrylate and butyl acrylate rubbers with grafted-on methyl methacrylate or styrene-acrylonitrile, interpenetrating siloxane and acrylate networks with grafted-on methyl methacrylate or styrene-acrylonitrile.

Furthermore, colorants, such as organic dyes or pigments and inorganic pigments, IR absorbers, may be added, individually, as a mixture or in combination with stabilizers, glass fibres, (hollow) glass spheres or inorganic fillers.

Polycarbonate melts which were produced by isolation of the polymer or by compounding can be spun in strand form through a die head and cooled with gas, e.g. air or nitrogen, or a cooling liquid, generally water, and the solidified strands can be granulated in commercially available granulators with cutters which are present, for example, on a rotating roll, in air, under inert gas, such as nitrogen or argon, or under water. Depending on the design of the apparatus column-like granules having a round or elliptical cross section and rough or smooth surface form are formed. The cut edges may be smooth or have a glass-like fracture with broken cut edges or remaining residues on the cut edges. Granules which are formed as uniformly as possible and have as few remaining projections as possible on the cut edges are desirable. Furthermore, the dust fraction in the granules should be kept as low as possible, preferably below 100 mg/kg of granules. The diameter of the granule particles should be between 0.5 mm and 10 mm, preferably 1 to 8 mm, particularly preferably 3 to 6 mm. While the length of the granule particles should be between 1 and 10 mm, preferably between 2 and 8 mm, and the weight between 10 and 50 mg, preferably between 15 and 30 mg. Granules whose ratio of diameter, of the average diameter in the case of an elliptical cross section, to length is 0.8 to 1.2 are preferred, and granules having a ratio of about 1 are particularly preferred. These parameters are subject to size distributions, distributions as narrow as possible are preferred, i.e. granules having dimensions as uniform as possible.

Cooling, spinning, granulation and the subsequent transport or the conveying of the granules with gas or liquid and the subsequent storage, optionally after a mixing or homogenization process, should be designed so that, in spite of any static charge build-up present, as far as possible no impurities are applied to the polymer surface, strand surface or granule surface, such as, for example, dust, abrasion material from the machines, aerosol-like lubricants and other liquids and salts from water baths or cooling systems possibly used.

The polycarbonates prepared according to the invention are suitable, for example, for the production of extrudates and mouldings, in particular those for use in the transparent area, very particularly in the area of optical applications, such as, for example, sheets, multi-wall sheets, glazings, diffuser screens, lamp coverings or optical data stores, such as audio CD, CD-R(W), DVD, DVD-R(W), minidiscs in their various read-only or recordable and optionally also rewritable embodiments.

Examples of further applications, but without limiting the subject of the present invention, are:

1. Safety screens, which are known to be required in many areas of buildings, vehicles and aircraft, and as visors of helmets.
2. Sheets.
3. Blow-moulded bodies (also see U.S. Pat. No. 2,964, 794), for example 1 to 5 gallon water bottles.

4. Transparent sheets, such as solid sheets, in particular hollow-chamber sheets, for example for covering buildings, such as railway stations, greenhouses and lighting systems.
5. Optical data stores, such as audio CDs, CD-R(W)s, DCDs, DVD-R(W)s, minidiscs and the subsequent developments.
6. Traffic light housings or traffic signs.
7. Foams having an open or closed optionally printable surface.
8. Filaments and wires (see also DE-A 11 37 167).
9. Lighting applications, optionally with the use of glass fibres for applications in the translucent area.
10. Translucent formulations containing barium sulphate and/or titanium dioxide and/or zirconium oxide or organic polymeric acrylate rubbers (EP-A 0 634 445, EP-A 0 269 324) for the production of transparent and light-scattering shaped articles,
11. Precision injection-moulded parts, such as holders, e.g. lens holders; polycarbonates comprising glass fibres and an optionally additional content of 1-10% by weight of molybdenum disulphide (based on the total moulding area) are optionally used here.
12. Optical instrument parts, in particular lenses for photographic cameras and cine cameras (DE-A 27 01 173).
13. Light transmission media, in particular optical fibres (EP-A 0 089 801) and lighting strips.
14. Electrical insulation materials for electrical conductors and for plug housings and connectors and capacitors.
15. Mobile telephone housings.
16. Network interface devices.
17. Carrier materials for organic photoconductors.
18. Lights, headlight lamps, light diffuser screens or inner lenses.
19. Medical applications, such as oxygenators or dialysers.
20. Food applications, such as bottles, crockery and chocolate moulds,
21. Applications in the automotive sector, such as glazings or in the form of blends with ABS as bumpers.
22. Sports articles, such as slalom poles or ski boot fasteners.
23. Household articles, such as kitchen sinks, wash basins, letterboxes.
24. Housings, such as electrical distributor boxes.
25. Housings for electrical devices, such as toothbrushes, hair-dryers, coffee machines, machine tools, such as drills, cutters, planes and saws.
26. Washing machine port holes.
27. Safety goggles, sunglasses, corrective glasses or lenses thereof.
28. Lamp coverings.
29. Packaging films.
30. Chip boxes, chip supports, boxes for Si wafers.
31. Other applications, such as animal shed doors or animal cages.

The invention will now be described in further detail with reference to the following non-limiting examples.

EXAMPLES

The dihydroxydiarylalkane used is 2,2'-bis(4-hydroxyphenyl)propane (Bisphenol A, BPA) and the solvent of the organic phase is a mixture of 50% by weight of methylene chloride and 50% by weight of monochlorobenzene.

Example 1

According to the Invention

The following were used as apparatuses for the individual process steps:

Process step (a): Disperser in the form of an aperture plate nozzle with predispersing (having an aperture plate with 5 bores of 2.5 mm diameter each with a perforated plate thickness of 2.35 and a pressure drop of 0.2 bar at 5.2 m/s flow velocity), 26 ms residence time in the predispersing space and subsequent dispersing (with a further aperture plate having 18 bores of 1.5 mm diameter each with a perforated plate thickness of 2.35 mm and 0.8 bar pressure drop at a flow velocity of 8.9 m/s) by which one liquid is dispersed in the other, with downstream flow tube, with 0.2 s residence time.

Process step (b): A pump-circulation reactor equipped with one metering point for NaOH solution, a pump, a heat exchanger, an overflow container and a T-shaped sampling point having a volume of 140 l, equipped with a pH probe and a conductivity probe; redispersing is effected on entry into the pump-circulation reactor Process step (c): A discharge pump and a coiled-tube reactor having mixing and dwell zones and a total volume of 60 l, Process step (d): a further coil-tube reactor having the same capacity as in process step 3, with a metering point for catalyst at the beginning of the reactor and a total volume of 80 l.

Subsequent Phase separation; Separation vessel (size 415 m$^3$ at a level of 50%).

The following streams were used in process step (a):
750 kg/h of BPA solution (15.22% by weight of BPA, based on the total weight of the solution, 2.08 mol of sodium hydroxide solution/mol of BPA)
53.9 kg/h of phosgene
615.6 kg/h of solvent mixture comprising 50% by weight of methylene chloride and 50% by weight of chlorobenzene The following streams were additionally used in process step (b):
9.3 kg/h of NaOH solution with 15% by weight of NaOH The following streams were additionally used in process step (c):
53.0 kg/h of NaOH solution with 15% by weight of NaOH,
35.1 kg/h of tert-butylphenol solution (11.4% by weight, in solvent mixture comprising 50% by weight of methylene chloride and 50% by weight of chlorobenzene).

The following streams were additionally used in process step (d):
29.5 kg/h of catalyst (3% strength by weight solution of ethylpiperidine in solvent mixture comprising 50% by weight of methylene chloride and 50% by weight of chlorobenzene.

The temperature in the pumped-circulation reactor was between 42° C. (after the heat exchanger) and 45° C. (before the heat exchanger). The temperature in the coiled-tube reactor in process step (c) was 46° C., that in the coiled-tube reactor in process step (d) was 45° C. and that in the separation vessel was 40° C.

The dispersing direction was set so that the organic phase was dispersed in the aqueous phase.

A phosgene excess of 9.7% by weight was employed. After the phase separation, the following values were determined:

| | |
|---|---|
| BPA in water | 1 ppm |
| Water content in the organic phase after settling | 1.07% by weight |

The low water content in the organic phase and the low residual monomer content BPA in the waste water showed outstanding quality of the phase separation. In addition, the dispersion showed good and stable separation behaviour.

Example 2

According to the Invention

The apparatus employed was as under Example 1, except that the dispersing direction was inverted, i.e. the aqueous phase was dispersed in the organic phase.

The following streams were used in process step (a):
754.9 kg/h of BPA solution (14.76% by weight of BPA, based on the total weight of the solution, 2.11 mol of sodium hydroxide solution/mol of BPA)
54.3 kg/h of phosgene
612.2 kg/h of solvent mixture comprising 50% by weight of methylene chloride and 50% by weight of chlorobenzene The following streams were additionally used in process step (b):
9.9 kg/h of NaOH solution with 25% by weight of NaOH The following streams were additionally used in process step (c):
25.2 kg/h of NaOH solution with 25% by weight of NaOH,
35.3 kg/h of tert-butylphenol solution (11.4% by weight, in solvent mixture comprising 50% by weight of methylene chloride and 50% by weight of chlorobenzene)

The following streams were additionally used in process step (d):
28.02 kg/h of catalyst (3% strength by weight solution of ethylpiperidine in solvent mixture comprising 50% by weight of methylene chloride and 50% by weight of chlorobenzene.

The temperature in the pump-circulation reactor was between 42° C. (after the heat exchanger) and 45° C. (before the heat exchanger). The temperature in the coiled-tube reactor in process step (c) was 46° C., that in the coiled-tube reactor in process step (d) was 45° C. and that in the separation vessel was 40° C.

A phosgene excess of 13.0% by weight was employed. After the phase separation, the following values were determined:

| | |
|---|---|
| BPA in the waste water | 13 ppm |
| Water content in the organic phase after settling | 2.5% by weight |

In spite of the higher residual monomer content of BPA in the waste water, high-quality phase separation was observed, with a water content in the organic phase which was still very low. In addition, the dispersion showed good and stable separation behaviour.

Comparative Example 3

Instead of the disperser, a baffle in which the two streams (aqueous and organic phase) are introduced into the pumped-circulation reactor at opposite points was used in process step (a) for mixing the organic phase with the aqueous phase.

The following streams were used in process step (a):
744.2 kg/h of BPA solution (14.88% by weight of BPA, based on the total weight of the solution, 2.13 mol of sodium hydroxide solution/mol of BPA)
53.7 kg/h of phosgene
641.1 kg/h of solvent mixture comprising 50% by weight of methylene chloride and 50% by weight of chlorobenzene The following streams were additionally used in process step (b):
9.8 kg/h of NaOH solution with 25% by weight of NaOH The following streams were additionally used in process step (c):
25.27 kg/h of NaOH solution with 25% by weight of NaOH
33.7 kg/h of tert-butylphenol solution (11.4% by weight, in solvent mixture comprising 50% by weight of methylene chloride and 50% by weight of chlorobenzene)

The following streams were additionally used in process step (d):
30.4 kg/h of catalyst (3% strength by weight solution of ethylpiperidine in solvent mixture comprising 50% by weight of methylene chloride and 50% by weight of chlorobenzene.

The temperature in the pumped-circulation reactor was between 42° C. (after the heat exchanger) and 45° C. (before the heat exchanger). The temperature in the coiled-tube reactor in process step (c) was 46° C., that in the coiled-tube reactor in process step (d) was 45° C. and that in the separation vessel was 40° C.

A phosgene excess of 13.3% by weight was employed. After the phase separation, the following values were determined:

| | |
|---|---|
| BPA in the waste water | 18 ppm |
| Water content in the organic phase after settling | 3.65% by weight |

Both the residual monomer content of BPA in the waste water and the water content in the organic phase were higher than were used according to the invention of the disperser. In the phase separation, large variations in the separation behaviour and instabilities in the separation were additionally observed.

Examples 4-8

For monitoring the effect of the dispersing and the course of the phosgenation according to process step (a), further experiments were carried out in a laboratory unit with a single-hole nozzle (according to FIG. 6), and both the phosgene concentration and the droplet size of the dispersed phase in the dispersion were measured.

Figure 6:
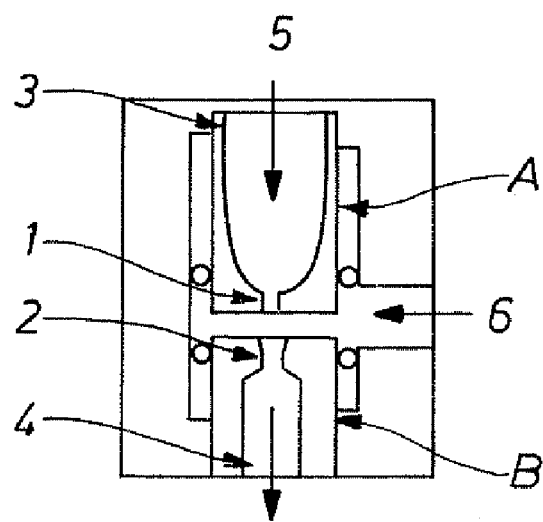
FIG. 6 is a schematic representation of a single-hole nozzle used as a disperser in Examples 4-8.

FIG. 6 shows the schematic drawing of the single-hole nozzle used as a disperser for Examples 4-8. The small bore 1 of the upper part A has a diameter of 0.75 mm and the small bore 2 in the lower part B has a diameter of 1.05 mm. The diameter 3 of the tube section in the upper part A of the nozzle is 2 mm and the diameter 4 of the tube section in the lower part B of the nozzle is 3 mm.

A 15% by weight BPA solution (based on the total weight of the solution) having a NaOH/BPA molar ratio of 2.1 was used as the aqueous phase for Examples 4-8. A mixture comprising 50% by weight of methylene chloride and 50% by weight of chlorobenzene was used as a solvent for the organic phase, to which mixture various amounts of phosgene were added in Examples 7 and 8. The reactants were dispersed in the nozzle described above, the direction of dispersing and hence the preadjustment of the dispersion (oil-in-water or water-in-oil) being determined by the inflows (the phase of the vertical upper stream 5 is dispersed in that of the horizontal lateral stream 6). The pressure drop over the nozzle was about 1.5 bar during the experiments. The reaction mixture was then introduced into a measuring chamber via a capillary. The total residence time in this measuring chamber was 200 ms. The chamber was equipped alternatively with an ATR crystal for measuring the concentrations (phosgene, chlorocarbonic acid ester and carbonate groups) or with a window for optical determination of the particle size distribution (i.e. droplet size distribution). The measurements were effected both continuously with flow-through and after closing of the valves at the end of the chamber (stopped flow technique).

The Examples 4-6 served merely for monitoring the droplet size distribution brought about by the disperser. Examples 7 and 8 served for quantifying the conversion in the reaction during the extremely short residence time of 200 ms.

Example 4

A solvent stream without phosgene (155 g/min) and a stream of aqueous BPA phase (200 g/min) were combined, the direction of the dispersing having been established so that a water-in-oil dispersion was formed. The size of the dispersed droplets was 46 µm (Sauter diameter, $d_{32}$) on flow-through. The Sauter diameter is known to the person skilled in the art and is described, for example, in Zlokarnik: "Rüthrtechnik, Theorie und Praxis [Stirring technology, Theory and Practice]" Springer Verlag 1999, page 232. It can be determined on the basis of known image processing methods by means of micrographs and counting and measuring of the particles. Stable phase separation took place after 4 s.

Example 5

A solvent stream without phosgene (155 g/min) and a stream of aqueous BPA phase (200 g/min) were combined, the direction of dispersing being established so that an oil-in-water dispersion was formed. The size of the dispersed droplets was 53 µm (Sauter diameter, $d_{32}$) on flow-through. Stable phase separation took place after 2 s.

Example 6

According to the Invention

A solvent stream comprising phosgene (190 g/min) and a stream of aqueous BPA phase (220 g/min) having a molar phosgene-to-BPA radio of 1.09:1 were combined, the direction of dispersing having been established so that an oil-in-water dispersion was formed. A very fine homogeneous distribution of the drops was observed. The size of the dispersed droplets was below the limit of resolution of 5 µm of the microscope on flow-through, i.e. smaller than 5 µm (Sauter diameter, $d_{32}$). The diameter of the droplets was 50 µm only 250 ms after the flow was stopped. 1 s after stopping of the flow, rapid coalescence took place. After a few minutes, stable phase separation took place.

Examples 4-6 showed that a substantially reduced size of the dispersed particles in a dispersion comprising aqueous and organic phase is not brought about solely by the use of a disperser but the surprising effect of the substantial reduction of droplet size is observed only in the presence of phosgene. The advantageous effect of the prior use of a disperser is accordingly surprisingly great in the case of the reaction, according to the invention, of phosgene with dihydroxydiarylalkanes.

Example 7

According to the Invention

Phosgene was added in an excess of 20 mol % (based on the amount of BPA used) to the organic stream (365 g/min flow rate of the organic stream). The phase ratio of organic to aqueous phase was 1:1 (volume ratio). After residence time of 200 ms in the feed line to the measuring chamber, phosgene was no longer detectable.

Example 8

According to the Invention

Phosgene was added without excess (based on the amount of BPA used) to the organic stream (360 g/min flow rate of the organic stream). The phase ratio of organic to aqueous phase was 0.84:1 (volume ratio). After residence time of 200 ms in the feed line to the measuring chamber, phosgene was no longer detectable.

Comparative Example 9

An arrangement as for Examples 4-8 was used, but without the nozzle shown in FIG. 6. The streams were combined via a T-piece. Phosgene was added in an excess of 20 mol % (based on the amount of BPA used) to the organic stream (365 g/min flow rate of the organic stream). The phase ratio of organic to aqueous phase was 1:1 (volume ratio). After residence time of 200 ms in the feed line to the measuring chamber, 10% of phosgene was detectable.

Examples 7-9 show that the use of the disperser leads to a potential reduction in the content of unconverted phosgene.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A continuous process for preparing a polycarbonate having a weight average molecular weight $M_w$ of 15,000 to 200,000 g/mol, the process comprising reacting a dihydroxydiarylalkane and phosgene in the presence of a catalyst in a phase boundary process comprising:
   continuously dispersing in a disperser an organic phase and an aqueous phase to form a mixture, the organic phase comprising at least a portion of the phosgene and a solvent suitable for the polycarbonate, and the aqueous phase comprising the dihydroxydiarylalkane, water and an alkali solution present in an amount of 1.5 to 2.5 moles per mole of the dihydroxydiarylalkane;
   reacting the mixture in a first reactor with a residence time of less than 0.5 seconds;
   further reacting the mixture in a second reactor with addition of a further amount of an alkali solution and, optionally, a chain terminator; and effecting further condensation in a third reactor with addition of a second further amount of an alkali solution and, optionally, a chain terminator, in the presence of the catalyst.

2. The process according to claim 1, wherein the mixture comprises an oil-in-water dispersion.

3. The process according to claim 1, wherein reacting the mixture is carried out at a temperature of −5° C. to 100° C.

4. The process according to claim 1, wherein reacting the mixture is carried out at a temperature of 15° C. to 80° C.

5. The process according to claim 2, wherein reacting the mixture is carried out at a temperature of −5° C. to 100° C.

6. The process according to claim 2, wherein reacting the mixture is carried out at a temperature of 15° C. to 80° C.

7. The process according to claim 1, wherein the phosgene is present in an amount of less than 15 mol % excess, based on the dihydroxydiarylalkane.

8. The process according to claim 2, wherein the phosgene is present in an amount of less than 15 mol % excess, based on the dihydroxydiarylalkane.

9. The process according to claim 5, wherein the phosgene is present in an amount of less than 15 mol % excess, based on the dihydroxydiarylalkane.

10. The process according to claim 1, wherein the phosgene is present in an amount of less than 13 mol % excess, based on the dihydroxydiarylalkane.

11. The process according to claim 1, wherein the dihydroxydiarylalkane comprises one or more selected from the group consisting of 4,4'-dihydroxybiphenyl, 1,1-bis(4-hydroxyphenyl)phenylethane, 2,2-bis(4-hydroxy-phenyl)propane, 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane, and mixtures thereof.

12. The process according to claim 2, wherein the dihydroxydiarylalkane comprises one or more selected from the group consisting of 4,4'-dihydroxybiphenyl, 1,1-bis(4-hydroxyphenyl)phenylethane, 2,2-bis(4-hydroxy-phenyl)propane, 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane, and mixtures thereof.

13. The process according to claim 5, wherein the dihydroxydiarylalkane comprises one or more selected from the group consisting of 4,4'-dihydroxybiphenyl, 1,1-bis(4-hydroxyphenyl)phenylethane, 2,2-bis(4-hydroxy-phenyl)propane, 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane, and mixtures thereof.

14. The process according to claim 1, wherein the disperser comprises one or more selected from the group consisting of nozzles and jet dispersers.

15. The process according to claim 2, wherein the disperser comprises one or more selected from the group consisting of nozzles and jet dispersers.

16. The process according to claim 1, wherein the catalyst comprises one or more components selected from the group consisting of tertiary amines, quaternary ammonium salts, quaternary phosphonium salts, and mixtures thereof.

17. The process according to claim 2, wherein the catalyst comprises one or more components selected from the group consisting of tertiary amines, quaternary ammonium salts, quaternary phosphonium salts, and mixtures thereof.

18. The process according to claim 1, wherein the disperser comprises a predisperser, a homogenizing nozzle and at least three pumps.

19. The process according to claim 2, wherein the disperser comprises a predisperser, a homogenizing nozzle and at least three pumps.

20. The process according to claim 5, wherein the disperser comprises a predisperser, a homogenizing nozzle and at least three pumps.

* * * * *